C. POWELL.
WHEEL ATTACHMENT.
APPLICATION FILED MAY 24, 1921.

1,404,644.

Patented Jan. 24, 1922.
3 SHEETS—SHEET 1.

C. Powell, Inventor

By C. A. Snow & Co.
Attorneys

C. POWELL.
WHEEL ATTACHMENT.
APPLICATION FILED MAY 24, 1921.

1,404,644.

Patented Jan. 24, 1922.
3 SHEETS—SHEET 2.

C. Powell, Inventor

By C.A.Snow&Co.
Attorneys

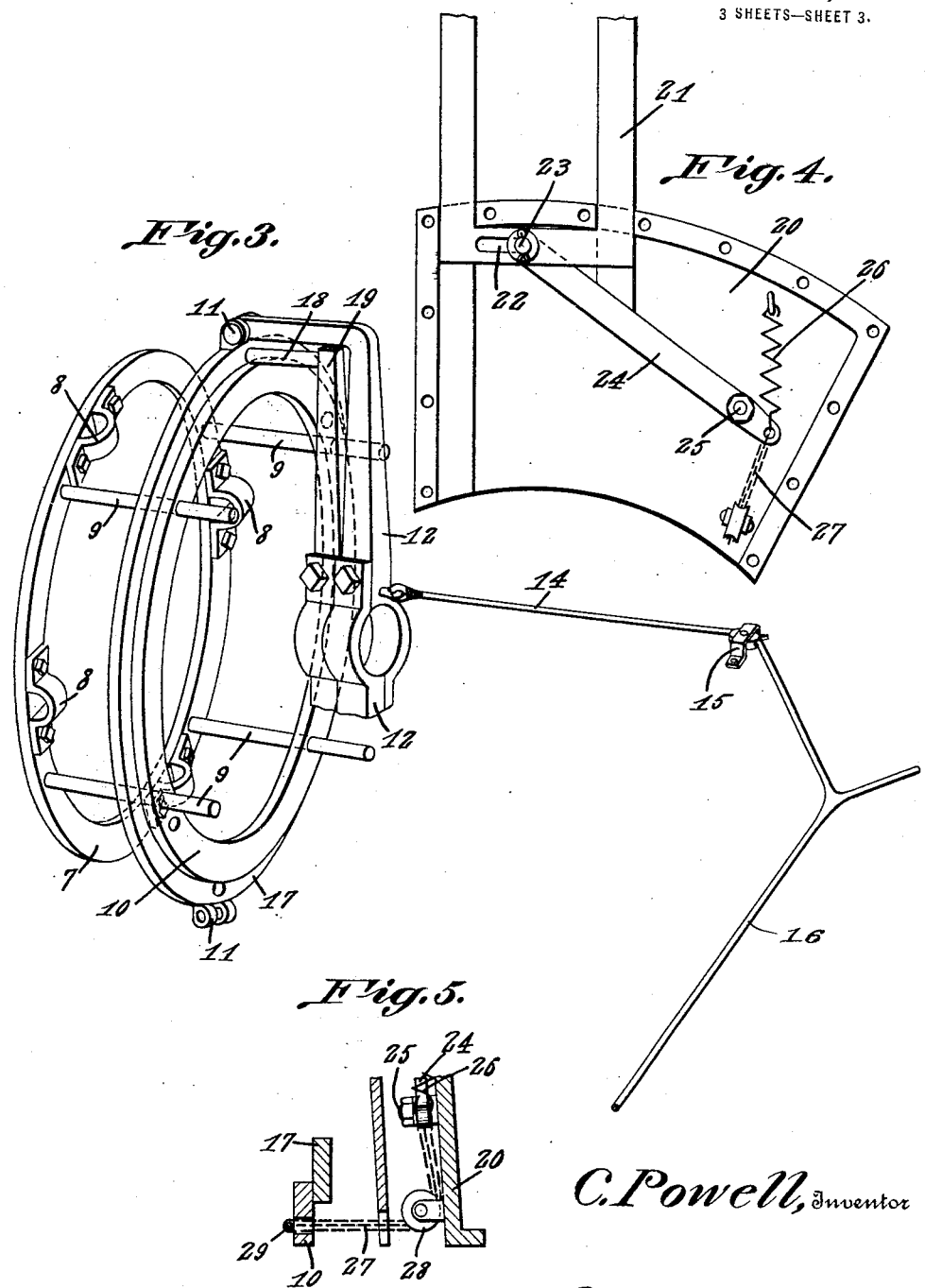

UNITED STATES PATENT OFFICE.

CHARLES POWELL, OF PAULS VALLEY, OKLAHOMA.

WHEEL ATTACHMENT.

1,404,644. Specification of Letters Patent. Patented Jan. 24, 1922.

Application filed May 24, 1921. Serial No. 472,134.

*To all whom it may concern:*

Be it known that I, CHARLES POWELL, a citizen of the United States, residing at Pauls Valley, in the county of Garvin and State of Oklahoma, have invented a new and useful Wheel Attachment, of which the following is a specification.

It is the object of this invention to provide a simple but efficient means under the control of an operator whereby, at any time, a traction element may be advanced beyond the periphery of the wheel, to secure a hold on the ground, thereby enabling a vehicle to move out of a stalled position, or to travel over slippery or muddy ground.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
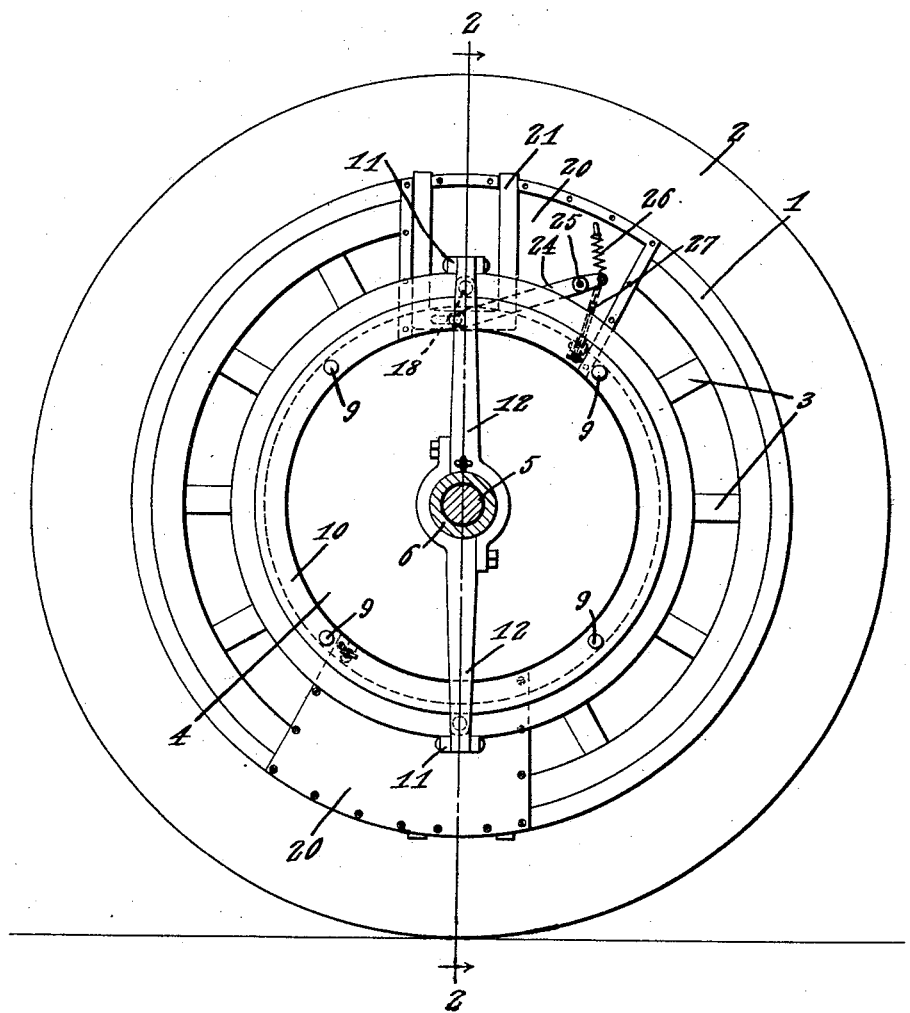
Figure 2:
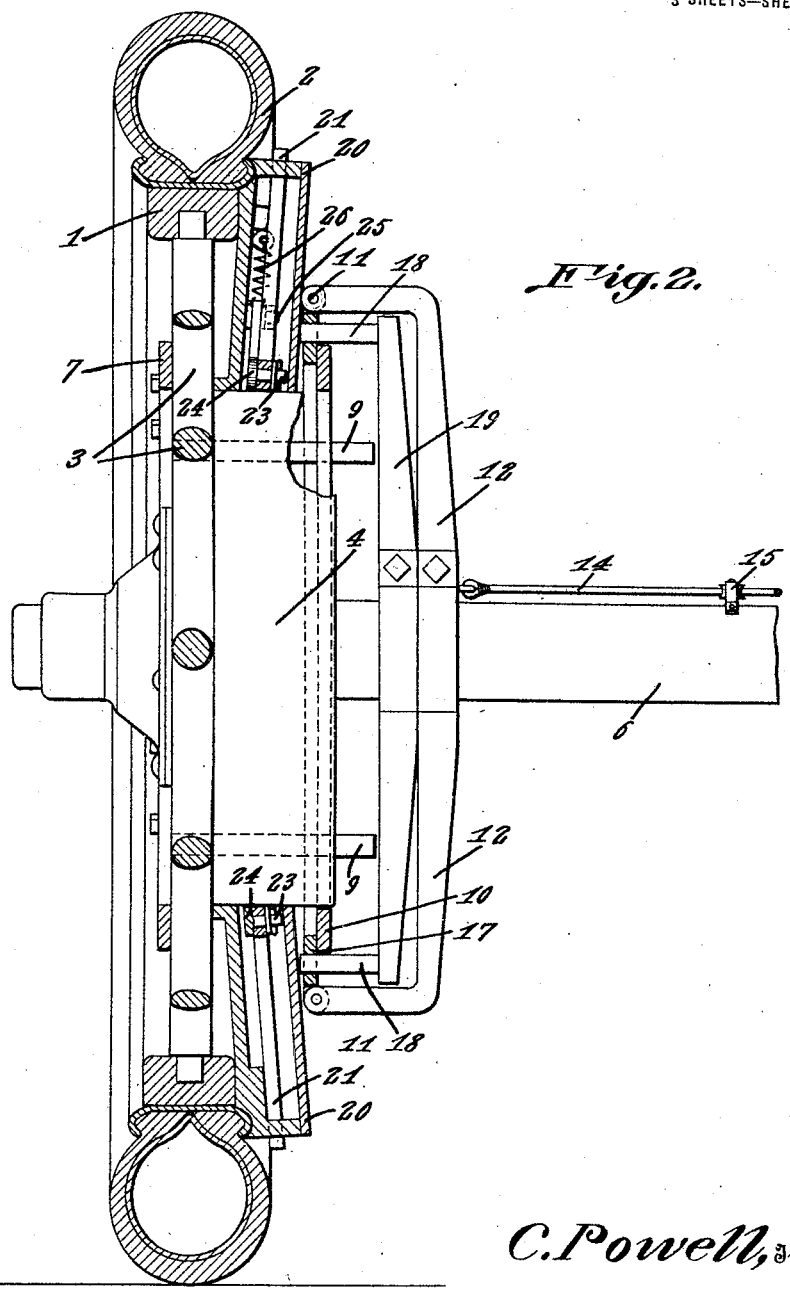

Figure 1 shows in elevation, a device constructed in accordance with the invention; Figure 2 is a section on the line 2—2 of Figure 1, parts remaining in elevation; Figure 3 is a perspective view showing a part of the operating mechanism; Figure 4 is an elevation showing one of the traction elements together with the means whereby the same is mounted and controlled; and Figure 5 is a sectional detail illustrating a portion of the means whereby motion is transmitted to the traction element.

The numeral 1 marks a vehicle wheel carrying a tire 2 and a brake drum 4, the spokes appearing at 3. The wheel 1 is mounted on an axle 5 journaled in an axle casing 6.

A ring or bracket 7 is secured by any suitable means 8 to the spokes 3 and has inwardly projecting fingers 9. A member 10, in the form of a ring, is slidable on the fingers 9 toward and away from the wheel 1, the member 10 rotating with the wheel.

The ring 10 is located inwardly of and is engaged by a ring 17 connected at 11 to a U-shaped arm 12 mounted to slide on the casing 6 longitudinally of the casing. One end of a flexible element 14 is attached to the arm 12, the other end of the flexible element being attached to a similar structure on the opposite side of the vehicle, if desired. The flexible element 14 slides in guides 15 on the casing 6. An operating member 16 is connected to the intermediate portion of the flexible element 14 and extends to any point which is accessible to the driver of the vehicle.

A cross arm 19 is secured to the axle casing 6 and forms an abutment for the arm 12 when the arm 12 is moved outwardly into the position of Figure 2. The cross arm 19 has outwardly projecting fingers 18 whereon the ring or member 10 is slidable, transversely of the wheel.

Casings or supports 20 are attached to the wheel 1. U-shaped traction elements 21 are mounted for right line reciprocation in the supports 20. The inner portion of each traction element 21 is supplied with an elongated slot 22 receiving a pivot element 23 on one end of a lever 24 fulcrumed at 25 on the support 20. One end of a retractile spring 26 is connected to the lever 24, the other end of the spring being connected to the casing 20. One end of a flexible element 27 is attached to the lever 24. Each flexible element 27 extends over a guide pulley 28 on the support 20 and through the brake drum 4, as shown in Figure 5, the flexible element 27 being secured at 29 to the ring 10.

In practical operation, when a pull is imparted to the operating member 16, the flexible element 14 draws the arm 12 and the ring 17 inwardly. The arm and the ring may be designated briefly as a slide mounted to reciprocate on the axle casing 6. The ring 17 engages the ring 10 and draws the ring 10 inwardly, the said ring sliding on the fingers 9. A pull is imparted to the flexible elements 27 by the ring 10, the levers 24 are tilted on their fulcra 25, the springs 26 are put under tension, and the traction elements 21 are advanced so that they will secure a hold upon the ground. When the occasion for the use of the device has passed, the parts are restored to the position of Figure 1 under the action of the springs 26, the arm 12 abutting against the arm 19.

I claim:—

1. In a device of the class described, a wheel; an axle casing; a traction member slidable on the wheel; a slide mounted to reciprocate on the casing; means for operating the slide; a member rotatable with the wheel and slidable transversely of the wheel, said member being under the control of the slide; and an operative connection between said member and the traction element.

2. In a device of the class described, a wheel; an axle casing; a traction member slidable on the wheel; a slide mounted to reciprocate on the casing; means for operating the slide; a member rotatable with the wheel and slidable transversely of the wheel, said member being under the control of the slide; a lever fulcrumed on the wheel; and means for connecting the lever with the traction member and with the member which is rotatable with the wheel.

3. In a device of the class described, a wheel; an axle casing; a traction member slidable on the wheel; a slide mounted to reciprocate on the casing; means for operating the slide; a member rotatable with the wheel and slidable transversely of the wheel, said member being under the control of the slide; a lever fulcrumed on the wheel; means for connecting the lever operatively with the traction member and with the member which is rotatable with the wheel; and spring means for retracting the traction member.

4. A device of the class described, constructed as set forth in claim 3, and further characterized by the fact that said spring means is in the form of a resilient element connected to the lever and anchored with respect to the wheel.

In testimony that I claim the foregoing as my own, I have hereto affixed my signature in the presence of two witnesses.

CHARLES POWELL.

Witnesses:
ATTSEVI BENNIE,
W. M. FREEMAN.